United States Patent [19]
Yamada

[11] Patent Number: 5,811,147
[45] Date of Patent: Sep. 22, 1998

[54] MINERAL PRESERVATIVE

[76] Inventor: Youjiro Yamada, 22-1, Shimootiai, 3-Chome, Shinjuku-ku, Tokyo, Japan

[21] Appl. No.: 410,904

[22] Filed: Mar. 27, 1995

Related U.S. Application Data

[63] Continuation-in-part of Ser. No. 261,336, Jun. 16, 1994, abandoned.

[51] Int. Cl.$^6$ .............................. A23L 3/34; A23L 3/358; A23L 3/3463
[52] U.S. Cl. .......................... 426/532; 426/654; 426/74; 426/49
[58] Field of Search ................................... 426/532, 654, 426/74, 49

[56] References Cited

U.S. PATENT DOCUMENTS 4,828,848   5/1989   Owades ..................................... 426/49

FOREIGN PATENT DOCUMENTS 0191765   4/1989   Japan .

OTHER PUBLICATIONS

JPO Abstracts, Abstracting JPO 01–91765, Abstract Publication date Apr. 11, 1989.
JPO Abstracts, Abstracting JPO 05–153937, Abstract Publication date, Jun. 22, 1993.
JPO Abstracts, Abstracting JPO 01–165336, Abstract Publication date, Jun. 29, 1989.
JPO Abstracts, Abstracting JPO 62–262964, Abstract Publication date Nov. 16, 1987.
JPO Abstracts, Abstracting JPO 62–91164, Abstract Publication date, Apr. 25, 1987.
JPO Abstracts, Abstracting JPO 61–100185, Abstract Publication date, May 19, 1986.
JPO Abstracts, Abstracting JPO 56–26186, Abstract Publication date, May 13, 1981.
JPO Abstracts, Abstracting JPO 55–55102, Abstract Publication date Apr. 22, 1980.
Furia, Handbook of Food Additives, 1968, The Chemical Rubber Co: Cleveland, p. 169.

*Primary Examiner*—David L. Lacey
*Assistant Examiner*—Choon P. Koh
*Attorney, Agent, or Firm*—James J. Ralabate

[57] ABSTRACT

The food and beverage preservative of this invention uses a finely divided calcium component in a solution of vinegar, alcohol and a fermented germ. The calcium component is present in said preservative in an amount of from 3,000 to 4,000 mg for each 100 to 200 cc of the solution. The preservative has a ph of from 4.5 to 5.5. The calcium component is derived from egg shells, clam shells, oyster shells, scallop shells, animal bones, fish bones, coral and any mixtures of two or more of these.

5 Claims, 5 Drawing Sheets

MINERAL PRESERVATIVE

This is a continuation-in-part of application Ser. No. 08/261,336 filed Jun. 16, 1994, abandoned. This application relates to a food and beverage preservative and, more specifically, to a calcium-containing preservative composition.

BACKGROUND OF THE INVENTION

There are many compositions that are known to have preservative properties when added to foods or beverages. Some of these chemical preservatives have adverse side effects when consumed and have legally imposed upper limits of usage. Other compositions that have been used as food preservatives for years are salt and vinegar. While they are relatively safe to use, their preservation effect is limited both in duration and in appropriate foods. Thus, the relatively complex chemicals heretofore used must be regulated because of health reasons while the relatively simple compositions such as salt and vinegar have limited application. Accordingly, there is a need for a natural, widely effective, relatively inexpensive, healthy and simple food and beverage preservative.

It is known to use various compositions containing calcium as preservatives for food and drink. In JP0 Abstracts (abstracting JP01-91765) such a composition is disclosed made by dissolving clam or oyster shells in any type of vinegar. These are the only two components of the JP01-91765 composition. Tests conducted using this composition on steamed meatloaf, surimi and buckwheat noodles showed a comparatively low duration preservative effect using this JP01-91765 composition. It is believed that much of this ineffectiveness can be attributable to lack of a fermenting agent and lack of an alcohol. Alcohol has an immediate bacteria-killing effect on foods and reduces significantly the starting point on the number of bacteria to be controlled for a long duration. The presence of fermentation is also very important to this invention.

Also, the use in the present composition of about a 1–15% acetic acid household vinegar is important.

SUMMARY OF THE INVENTION

It is therefore an object of this invention to provide a food and beverage preservative devoid of the above-noted disadvantages.

Another object of this invention is to provide a natural and easily formulated food and beverage preservative.

Another yet further object of this invention is to provide a food preservative composition that will not interfere with the original taste of the food or beverage.

Still a further object of this invention is to provide a preservative that is effective on a large variety of foods and beverages.

Yet another object of this invention is to provide an effective, healthy preservative that is made up of naturally consumable materials without any substantial side effects or toxicity.

Still yet a further object of this invention is to provide a food and beverage preservative that is relatively inexpensive to manufacture and simple to formulate.

These and other objects of this invention are accomplished by a novel food and beverage composition for preserving foods and beverages that is made up of naturally occuring calcium, alcohol and vinegar. The calcium is made up of a very finely ground powder of egg shells, clam shells, oyster shells, scallop shells, animal or fish bone or mixtures thereof. The preservative is made by the following process:

A solution is made up of water and a 90% pure alcohol (known consumable alcohols), the type of alcohol that is commonly used as a solvent in beverages (such as ethyl alcohol), medicines and other human consumable compositions. This water alcohol solution comprises 20 parts by volume of (the 90% alcohol) and 80 parts by volume of water. An acetic acid bacterial fermented agent such as Acetobacter and Gluconobacter can be added to the alcohol solution in an amount of 0.3 parts and 3.0 parts (or any other suitable amount) of apple vinegar (or other household used vinegars) is added to the resulting solution. The solution resulting becomes fermented (as about 15% acetic acid vinegar with at least 3% alcohol present. To the resulting solution a finely ground not exceeding 30 mm (preferably 0.1 mm) egg shell powder is added. The egg shell powder is added in an amount of 20 parts by weight of egg shell powder to 80 parts by volume of the vinegar. The egg shell-vinegar solution should stay about two days and should be reacted completely. Subsequently, it is filtered by known filter paper or a cotton cloth fiber. The resulting solution contains 3800 mg of calcium in 100 ml of the whole fermented solution with at least 3% of an alcohol present. The calcium combines and reacts with the acetic acid-alcohol (fermented solution) and it is ionized.

The amount of calcium to the fermented solution is preferred for best results to be 3800 mg. of calcium per 100 ml of the fermented solution; however, from 1000 to 8000 mgs of calcium can be used with at least 100 ml of the fermented solution and still be within this invention. With the above method substantial amounts of finely ground natural calcium can be dissolved in the heretofore described vinegar solution.

The material of this invention thus is made by using:

A. 90% pure consumable and non-toxic alcohol; preferred are alcohols used in the manufacture of whiskey and human consumable products such as ethyl alcohol. Alcohols that can be used in this invention range from 5% to 95% concentrations; it is critical to this invention that at least 3% alcohol remain. Without an alcohol present, there is little or no initial reduction of bacteria in the foods treated.

B. Distilled water or normal tap water;

C. Fermented agent; preferred are Acetobacter, Gluconobacter and other acetate acid fermented agents;

D. Preferred is vinegar with concentration of 1% to 14%;

E. Calcium powder used ranges from 0.1 to 30 mm made from egg shells, oyster shells, clam shells, scallop shells, animal bones or mixtures thereof.

The final preservative can contain from 1000 to 8000 mg of calcium for 100 ml or cc of the mineral soluble solution. While it is preferred for best results that the ph of the final preservative be from 4.5 to 5.5, a ph of from 4.0 to 7.0 is acceptable.

Obviously, if it is desirable in certain situations to use a solid rather than a liquid, the crystal powder of this liquid formulation of this invention may be used. The crystal form is obtained by merely removing the liquid from the formulation and drying the residue. The formulation or composition of this invention is effective against most bacteria and especially effective against thermoduric bacteria which are difficult to control using other preservatives or by heating.

The following examples illustrate the effectiveness of the present preservative. All parts and percentages are by weight unless otherwise specified. In all of the below examples known or standard bacteria testing was conducted. General bacteria means any form of bacteria.

EXAMPLE 1

To a sample 500 gms of buckwheat noodle dough was added 10 ml of the solution-preservative of the present invention with egg shell calcium as above defined. A temperature of 15° C. was maintained. The 10 ml of the preservative was stirred into the buckwheat powder and water so that it was evenly distributed throughout the sample with following results:

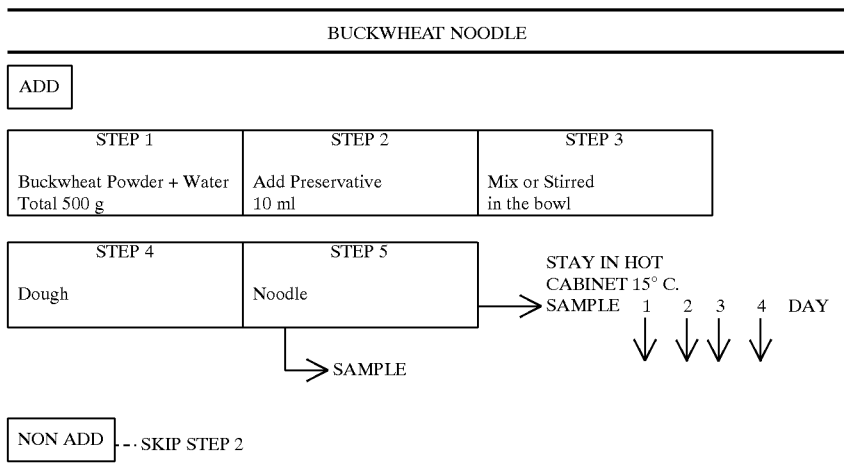

The general bacterias continue to grow every day. Eye count the number of general bacterias in the ADD and NON ADD samples as illustrated above. Sample 10 g is diluted by 90 CC of clean water (means X10) and 1 cc of diluted sample is put in shallow. "Shallow" is the petri dish that is used for culturing bacteria. It is called "Number of Bacterias in Sample 1g."

The following general procedure is used to determine the bacteria count indicated in the below examples and graphs.

How to Eye Count the Bacterias (International Standard)

Purpose: eye count the bacterias in 1 g of food sample.
Procedure: If three ten thousand bacterias ($3\times10^4$) in 1 g of food sample, it is difficult to count. Because there are too many bacterias. One gram sample (1 gm) is diluted as follows:

| STEP 1 | A | sample 1 g<br>water 9 cc<br>make A | A |
| --- | --- | --- | --- |
| STEP 2 | B | A 1 g<br>water 9 cc<br>make B | B |
| STEP 3 | C | B 1 g<br>water 9 cc | C |
| STEP 4 | D | C 1 g<br>water 9 cc | D |
| STEP 5 | Move it in a shallow. | | |
| STEP 6 | Keep 24 hours in hot cabinet (35° C.) | | |
| STEP 7 | The bacteria grew about 1 or 3 mm in size. An eye count is taken of the bacterias and if there are three bacteria, it is calculated as in the following example: | | |

Hours of Growth of General Bacteria in Buckwheat Noodle Samples

| DAY | 1 | 2 | 3 | 4 |
| --- | --- | --- | --- | --- |
| Add. | $1 \times 10^5$ | $2 \times 10^5$ | $7 \times 10^5$ | $9 \times 10^5$ |

-continued

| DAY | 1 | 2 | 3 | 4 |
| --- | --- | --- | --- | --- |
| Non Add. | $1 \times 10^5$ | $2 \times 10^7$ | $3 \times 10^9$ | $1 \times 10^{10}$ |

The figures $1\times10^5$, $2\times10^5$, $7\times10^5$ and $9\times10^5$ etc. mean the number of bacteria found in 1 gm of sample. Test for general micro bacteria was conducted with the above results.

EXAMPLE 2

To a sample 500 gm of meatloaf made from beef was added 10 cc or ml of the solution-preservative of the present invention using egg shell calcium as above defined. "Day" means the number of days where bacteria count was measured by eye count on the sample which was cultivated in a shallow or shallow dish. "Add" means the preservative of this invention was added to the sample meatloaf; "Non Add." means no preservative was added to an aliquat portion of the same sample. The following flow chart shows the general test procedure followed.

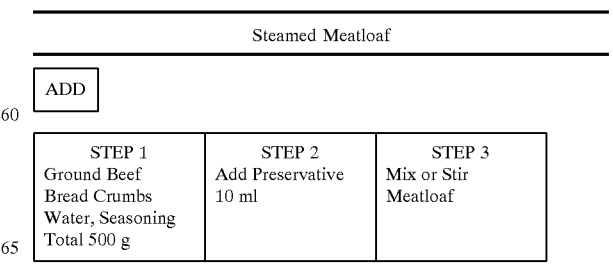

-continued

Steamed Meatloaf

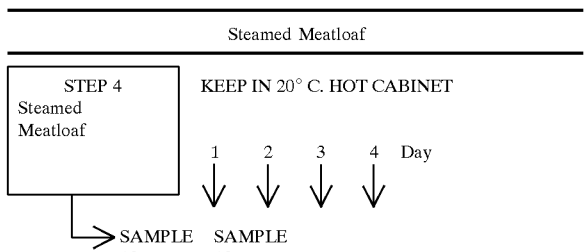

| | |
|---|---|
| ADD | Eye Count of General Bacteria of ADD and NON ADD sample above noted is taken in shallow and also eye count of *Escherichia Coli* (*E. Coli*) of ADD and NON ADD sample above noted is taken in shallow. |
| NON ADD | |

Hours for Growth of General Bacteria Steamed Meatloaf

| Day | 1 | 2 | 3 | 4 |
|---|---|---|---|---|
| Add. | <300 | <300 | <300 | <300 |
| Non Add. | $8 \times 10^3$ | $1.9 \times 10^5$ | $2.1 \times 10^7$ | $8 \times 10^8$ |

The result of test which was an eye count bacteria test viewed under a microscope or other imitable means for *Escherichia coli* on the 4th day as well as test (visual microscope view test) for general bacteria is as follows:

1. "Add"—no *Escherichia coli* found with a very slow increase of *E. coli* and other bacteria.
2. "Non Add."—$2 \times 10^8$ (other bacteria or *Escherichia coli* or both)
3. $2 \times 10^8$ means or indicates 0.2 billion bacteria in 1 gm of sample was found.
4. <300 means or indicates that very little was found.

EXAMPLE 3

To a sample portion 500 gm of fish surimi which is a cod fish was added 10 ml of the preservative of this invention using oyster shell as the source of natural calcium (same amount as egg shell ie 3,800 mg/100 ml of vinegar solution). The temperature during the preservative addition was 15° C. The following results were obtained using same tests as in earlier examples.

Hours for Growth of General Bacteria in Surimi

| DAY | 1 | 2 | 3 | 4 |
|---|---|---|---|---|
| Add. | $1 \times 10^2$ | $2 \times 10^2$ | $2 \times 10^2$ | $4 \times 10^2$ |
| Non Add. | $4 \times 10^2$ | $1 \times 10^5$ | $9 \times 10^6$ | $3 \times 10^8$ |

The results were determined by the same method as in Example 2.

EXAMPLE 4

To 500 gm sample of potato salad made with mayonaise was added 10 ml of the preservative solution of this invention using powdered short-necked clam shell as the calcium component. Checking for number of general bacteria the following results were obtained:

Hours for Growth of General Bacteria in Potato Salad

| DAY | 1 | 2 | 3 | 4 |
|---|---|---|---|---|
| Add. | $2 \times 10^5$ | $1 \times 10^4$ | $3 \times 10^5$ | $3 \times 10^6$ |
| Non Add. | $7 \times 10^6$ | $3 \times 10^8$ | $6 \times 10^8$ | $2 \times 10^9$ |

EXAMPLE 5

$3 \times 10 \times 10 \times 10 \times 10$

= $3 \times $STEP $1 \times$ STEP $2 \times$ STEP $3 \times$ STEP 4

= $3 \times 10^4$

= 3 ten thousand bacterias in 1 g food sample.

Same procedure should be followed in both ADD and NON ADD sample procedures. These are the first day figures, and second day will be taken by the same procedures, and compare the changes of between ADD and NON ADD. And the same procedures will be taken following days. If the numbers of bacteria grew up to more than ten million in 1 g food sample, the test should be stopped because the food is dangerous to eat.

Throughout the below comparative tests conducted of Examples 5 and 6, the composition of JP01-91765 used was 4 grams of crushed oyster dissolved in 100 ml of any edible vinegar. The exact composition disclosed in JP01-91765 therefore was used in all of the following tests. The compositions of JP01-91765 will be hereinafter referred to as "JP01".

Also throughout the comparative tests of Examples 5 and 6 the composition of the present invention (referred hereinafter as "Cal-Keep" or "Cal-Keep L") was prepared as follows:

EXAMPLE 5

A composition of the present invention can be made as follows:

Process

1st Step: Starting Composition 23 ml of a consumable alcohol such as ethyl alcohol (density 90%) 0.3 gram of Gluconobacter (fermenting germ or agent) 77 ml of water 2nd Step: Mix and ferment the above composition of 1st step for about 60 hours., i.e. $C_2H_5OH+H_2O+$ fermenting germ.

3rd Step: Fermented Composition Organic acid liquid, mainly acetate acid 17% Out of 20 ml of alcohol, 17% is changed to acetate acid but it is critical that at least 3% (of total composition) of alcohol remains. More alcohol can be present if desirable.

4th Step: Either 12 grams scallop shell powder or 8 grams egg shell powder or 20 grams of either powder above (both 0.1 mm or under size powder is used in the fermented composition of 3rd step.

5th Step: There was continued fermentation of composition of 4th step for about 30 hours.

6th Step: Complete Mineral Preservative (fermented solution) 100 cc of composition containing 3.8 grams of ionized calcium Ca $(CH_3COO)_2$—$H_2O$ 3% of alcohol 3.4 grams of acetate acid, the composition had a pH of 4.8.

Using 8 cc of the above indicated compositions on 400 grams of steamed meatloaf, the result of the tests of A (Cal-Keep) and B (JP01) were as follows:

SAMPLE A. Using the present Cal-Keep L composition rotted after 25 days from application of Cal-Keep.

SAMPLE B. Using the JP01 composition rotted after only 4 days from application of JP01 composition.

EXAMPLE 6

A second composition of this invention can be made as follows:

Process

1st Step: Composition 30 ml of alcohol (density 90%) 0.3 gram of Gluconobacter (fermenting germ or agent) 70 ml of water 2nd Step: Mix and ferment the above composition of 1st step for about 60 hours, i.e. $C_2H_5OH+H_2O+$ fermenting germ.

3rd Step: Fermented composition Organic acid liquid, mainly acetate acid 17% Out of 20 ml of alcohol, 17% is changed to acetate acid, but it is critical that at least some alcohol remain in this test 10% (of total composition) of alcohol remains, i.e. $CH_3COOH+C_2H_5OH+H_2O+$ organic acid.

4th Step: Either 12 grams scallop shell powder or 8 grams egg shell powder (or in the alternative 20 grams of either), 0.1 mm or under size powder is used in the fermented composition of 3rd step.

5th Step: There was continued fermentation of composition of 4th step for about 30 hours.

6th Step: Complete Mineral Preservative (fermented solution) 100 cc of composition containing 3.8 grams of ionized calcium $Ca(CH3COO)_2$—$H_2O$ 10% of alcohol 0.05 grams ionized Magnesium $Mg(CH_3COO)_2$—$H_2O$ 0.05 grams ionized Potassium $CH_3COOK$ 0.06 grams ionized Sodium $CH_3COONa$—$3H_2O$ 0.08 grams ionized Phosphorus 3.4 grams of acetate acid, the composition had a pH of 4.8.

Using 8 cc of the above-indicated compositions on 400 grams of steamed meatloaf, the result of the tests of A (Cal-Keep) and B (JP01) were as follows:

SAMPLE A. Using Cal-Keep composition rotted after 25 days from application of Cal-Keep.

SAMPLE B. Using 8 cc of the earlier mentioned JP01 composition rotted after only 4 days from application of JP01 composition.

DESCRIPTION OF THE DRAWINGS AND PREFERRED EMBODIMENT

Figure 1:
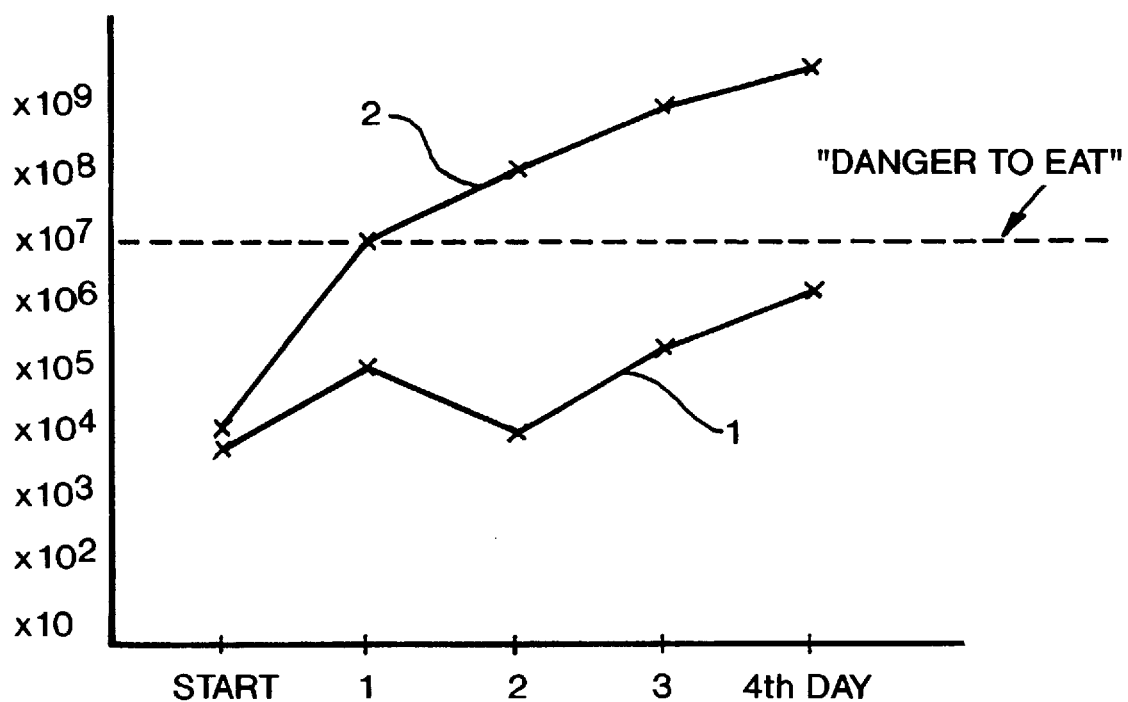
FIG. 1 illustrates a graph showing the hours of growth of bacteria in "add" and "Non Add" samples.

In FIG. 1 line 1 is a line tracing a four day bacterial growth when the preservative of this invention is added to a potato salad sample. Note even after four days the potato salad has low bacterial count (as shown on the left hand margin) and can be safely eaten. The dotted line indicates the bacteria count where it is unsafe to eat. Line 2 shows a bacteria count from days 1–4 without added preservative; the bacteria count in this sample (line 2) has a high bacteria count as indicated on the graph in the vertical left hand margin and cannot be safely eaten even after the first or second day. ADDed 2% of mineral preservative of this invention can safely hold four days without danger of being eaten. As shown in FIG. 1, on the fourth day the $3\times10^6$ bacteria reading for the sample with the present preservative added is within the safe and acceptable bacteria range. The $2\times10^9$ without added preservative is not within this bacteria acceptable range as indicated by the graph of FIG. 1.

Figure 2:
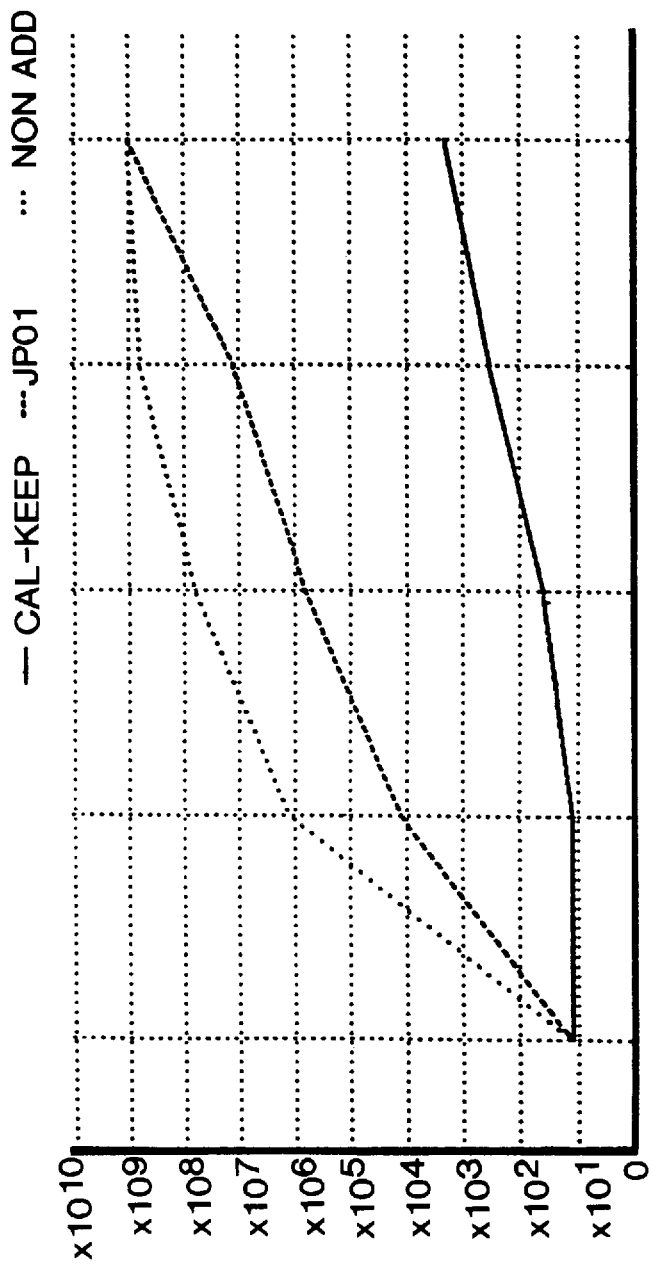
FIG. 2 is a graph that illustrates the preservative effect on meatloaf of the present composition (Cal-Keep), the effect on meatloaf of the JP01 composition, and non-treated (Non Add) meatloaf.

In FIG. 2 a first portion of the same sample of steamed meatloaf was treated with 10 cc of Cal-Keep and a second portion of said sample was treated with 10 cc of the JP01 composition. A third portion of said sample was untreated. The resulting presence of bacteria after four (4) days is clearly illustrated. The sample treated with 10 cc of 1% Cal-Keep (the present composition above described) containing ground egg shells as the calcium source showed a very low $3\times10^3$ bacteria count whereas the sample treated with the same amount of JP01 composition showed after four (4) days a high $1\times10^9$ bacteria count which was the same for the untreated sample of steamed meatloaf. This four day difference is very dramatic and shows that the composition disclosed by JP01 had no effect after four days whereas the present composition was very effective.

This same comparison conducted with calcium from ground scallop, clam or oyster shells had substantially the same effect whereas the sample treated with JP01 had virtually no effect after four days.

Figure 3:
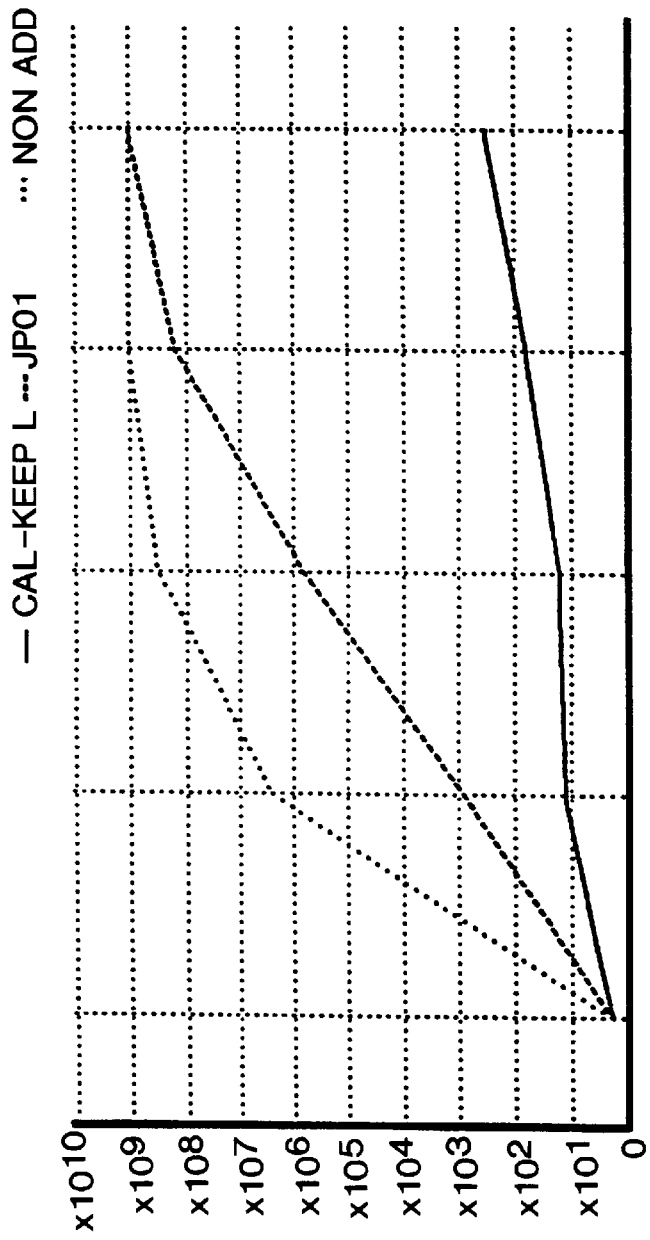
FIG. 3 is a graph that illustrates the results of separate samples of the same Surimi fish treated with Cal-Keep L and one sample treated with JP01 composition these compared with untreated Surimi.

In FIG. 3 a sample of the same Surimi fish was divided into three parts; the first part was treated with 2% by weight of Cal-Keep L, the second part was treated with an equal amount of the JP01 composition and the third part was untreated. After four days (after treatment), the untreated sample and the JP01 treated sample had the same number of bacteria present. Compare this with the number of bacteria present in the sample treated with Cal-Keep L; i.e. Cal-Keep L had only $5\times10^2$ bacteria whereas the untreated and JP01 treated samples had a very high bacteria count of $1\times10^9$.

Figure 4:
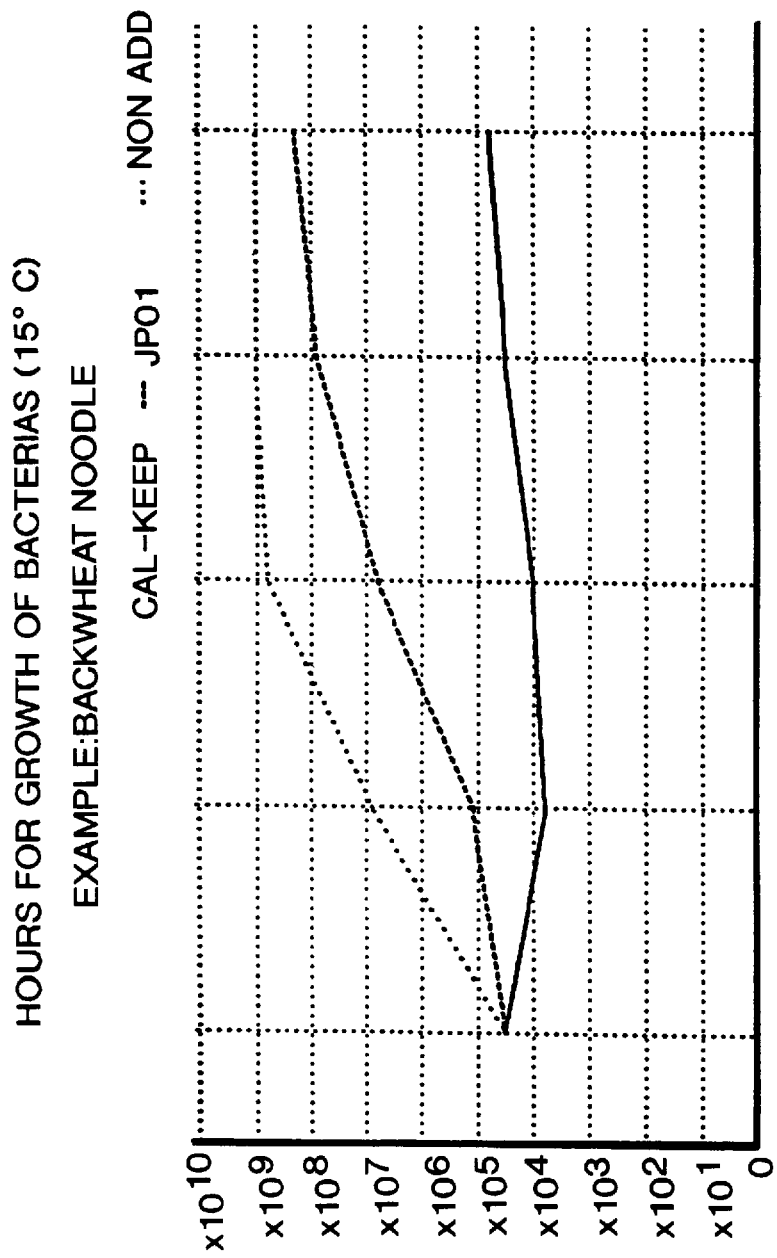
FIG. 4 is a graph that illustrates the results of the same Buckwheat Noodle samples treated with only Cal-Keep, with only JP01 and untreated noodles.

In FIG. 4, separate 400 grams of the same Buckwheat Noodle sample was treated with Cal-Keep, a second 400 gram sample was treated with JP01 and a third sample was left untreated. The Cal-Keep sample had a very low $8\times10^4$ bacteria count after standing for four days while the JP01 sample had a relatively high and unacceptable bacteria count of $3\times10^8$. The untreated sample (Non-Add) had a bacteria count of $1\times10^9$ after four days standing. A substantial part of the effectiveness of the Cal-Keep (present composition) is due to the presence of alcohol in the Cal-Keep composition. The alcohol immediately kills bacteria upon application as can be seen in the graph of FIG. 4 where at the first day there was a significant drop in bacteria count from the initial sample. This same alcohol immediate effect can be seen also in FIG. 2.

Figure 5:
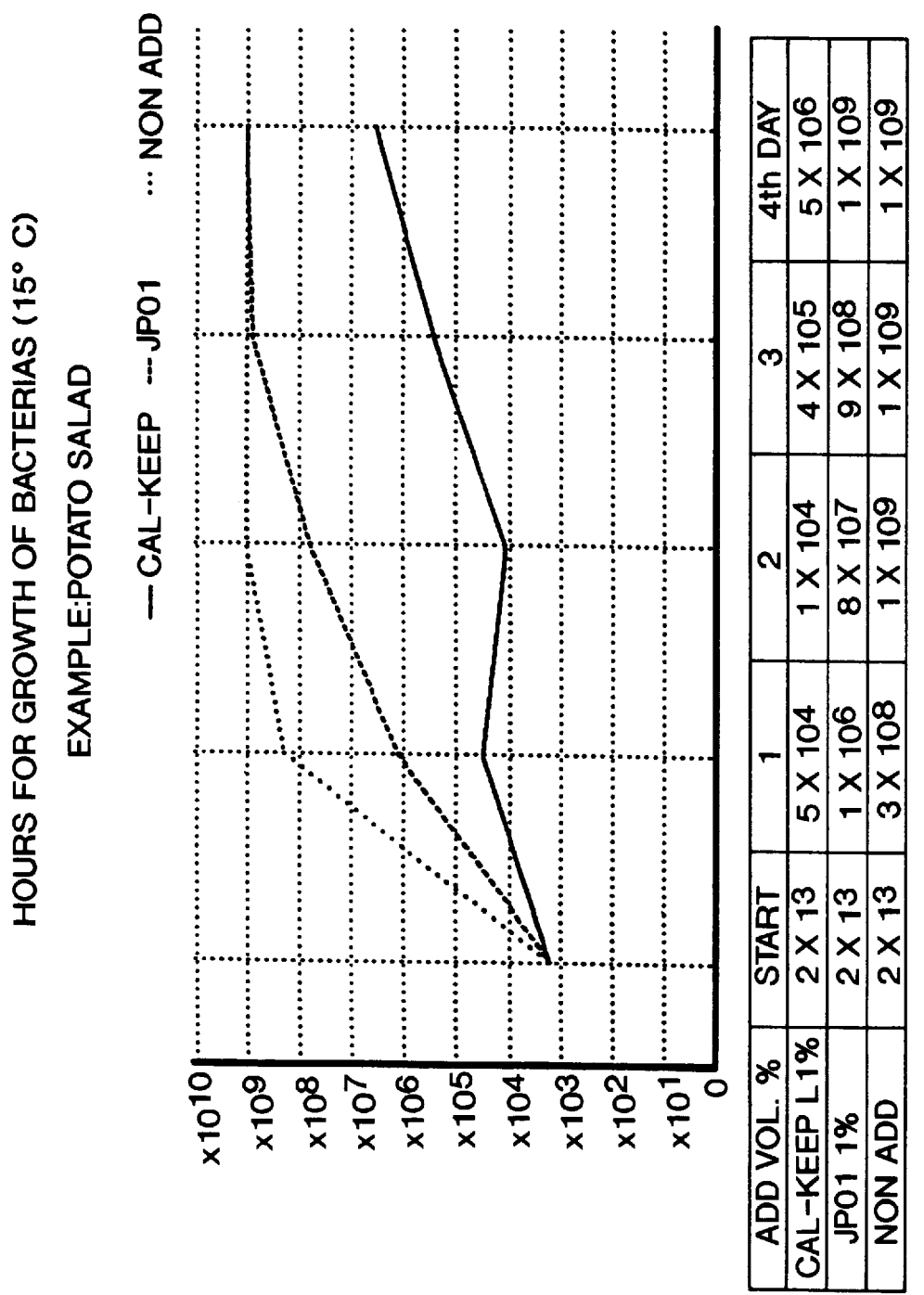
FIG. 5 is a graph comparing samples of the same mayonnaise-containing potato salad treated with: Cal-Keep only, JP01 only and untreated potato salad.

In FIG. 5 a sample of potato salad was divided into three equal portions. The first portion was treated with 10 cc Cal-Keep L which contained 12 grams of scallop powder and 8 grams of egg shell powder as the calcium component. The second sample portion was treated with 10 cc of JP01 preservative and the third portion of the sample was left untreated. After four days standing at 15° C. (as is the temperature in all of the other figures), the JP01 and Non-Add samples were unsafe to eat, each having a very high bacteria count of $1\times10^9$. The Cal-Keep treated sample had a comparatively low bacteria count of $5\times10^6$.

The compositions of Cal-Keep were varied in all of the tests shown by the figures disclosed herein; i.e. in FIG. 2 ground scallop shell powder was used whereas in FIG. 3 ground clam shell powder was used. In FIG. 4 fish bone powder was used whereas in FIG. 5 mixtures of clam and scallop shell powder was used. In all figures the Cal-Keep (present composition) treated samples are shown in a solid line, the JP01 treated samples are shown in a dashed line and the untreated samples shown in a dotted line. The calcium component in all samples of Cal-Keep was present in the preservative composition in an amount of from 3000 to 4000 mg for each 100–200 cc of the fermented solution. The amount of Cal-Keep or Cal-Keep used was 10 cc which was the same as the amounts of the JP01 preservative used. The ph of all of the Cal-Keep compositions used was maintained between 4.7 and 5.5. The powder in all Cal-Keep or Cal-Keep L compositions of FIGS. 1–5 was kept below 30 mm; beyond that size it will not fully dissolve and will filter out of solution.

The above examples and graphs show the effectiveness of the present food and beverage preservative when used within the prescribed ranges.

Therefore, a primary purpose of this invention is a composition for food preservation using a calcium containing composition derived from seafood shells, egg shells, cattle bones and corals. Also useful is animal calcium dissolved into a fermented liquid.

This food preservative is made from dissolved egg shells, cattle bones and fish bones into fermented liquid of fermented solution. A longer usable edible period for foods is attained by adding this preservative to food and beverages. A main ingredient of this preservative is dissolved and ionized calcium since its taste is mild and smooth. Therefore, this preservative has no effect on the taste of and quality of food while providing a desirable effect on preservation thereof.

It is critical to this invention that the following amounts be used of calcium with from 1000 to 8000 mg for each 100 ml of the fermented solution be used. The fermented solution must be made up of from 10% to 17% vinegar or consumable acetic acid, from 10% to 30% of a consumable alcohol such as ethyl alcohol. It is also critical to the present invention that at least 3% and preferably 3–10% of alcohol remains in the final composition. The alcohol has an immediate killing action on the bacteria and reduces the bacteria numbers to be controlled over an extended period. Percents are by weight. The fermented germ used such as acetic acid bacteria of Acetobacter or Gluconobacter agent is used in an amount of from 10 to 800 mg. The powdered egg shell, clam shell, animal or fish bone or other source of calcium used must not exceed 30 mm in sice or it will not ionize in solution and will filter out and not function in the intended manner. These are all critical features of the present invention.

The properties of the preservative (Cal-Keep or Cal-Keep L) of this invention are as follows:
Contents: Fermented liquid of shell calcium; 3800 mg of calcium is included per 100 cc of the fermented alcohol-containing solution.
Characteristics: It is effected with products having ph between 7.0 to 2.5 and it is very effective on general bacteria such as thermospore, standard plate, *E. coli,* yeast and mold. It does not affect the original flavor of consumable products.
Physical Properties: slight yellow, clear liquid, water soluble, ph 5.1 (±0.2), heat stable until 110° C.
Application: preservative to any kind of consumable beverage, meat, fish, vegetable, fruit, pasta, all processed food, delicatessen and steamed rice.
How to use: Add 1.0%–6.0% of preservative of this invention based on weight of food sample to total weight of food materials (except adding water).
Description: liquid calcium
Package: 20 kg plastic container in the carton box, 1.8 liter plastic bottle×6 bottles/carton box.

This invention thus involves a Liquid Mineral (calcium) Food Preservative and method to Preserve Food and Drinks. Preservative material with shells, egg shells, cattle bones, fish bones and corals dissolved into alcohol-fermented liquid of acetic acid or liquid of glacid acetic acid. Preservative material dissolved into the fermented liquid of acetic acid or liquid of glacid acetic acid, recommended with 1%–20% of calcium and a composition having a concentration of 1%–15% of acetic acid and subsequently added to a calcium one or more of the following materials: shell powder, egg shell powder, cattle bone powder, fish bone, coral powder, ascorbic acid, sodium acetate, sugar fatty acid ester, glyceric fatty acid, glycin, calcium citrate, calcium acetate, calcium lactate, polyridine, chitosan. Method to food and beverages aimed for longer preservation period by adding the material mentioned in item 1 or 2 above to the following foods, for instance, steamed rice, buckwheat noodle, noodle, hamburger, meatloaf, surimi, fried surimi, ham, sausage, bread, cake, dumpling, egg roll, spring roll, cod roe, salad, mayonnaise, cream custard, sauce, gravy, soup, croquettes, fried food, curry paste, bean paste, soy sauce, fruit and vegetable juice, candy, jam, retorted food, pickles, cooked vegetables, fried vegtables, cheese, rice cake, cooked beans.

The preservative of this invention is a food and beverage preservative comprising a fermented solution of at least 3% (of total composition) alcohol, a fermented agent and a calcium component, said calcium components derived from a powder of a material selected from the group consisting of egg shells, scallop shells, clam shells, oyster shells, coral, animal bones, fish bones or mixtures thereof, said preservative having a ph of from 4.0 to 7.0 and is heat stable up to 110° C., said calcium component present in said preservative in an amount of from 3,000 to 4,000 mg for each 100 to 200 cc of said fermented solution.

The preferred and optimumly preferred embodiments of the present invention have been described herein and shown in the accompanying drawings to illustrate the underlying principles of the invention, but it is to be understood that numerous modifications and ramifications may be made without departing from the spirit and scope of this invention.

What is claimed is:

1. A food and beverage preservative comprising a calcium component dissolved in a fermented solution of vinegar, alcohol, and a fermenting agent, said calcium component derived from a powder of a material selected from the group consisting of egg shells, scallop shells, clam shells, oyster shells, coral, animal bones, fish bones or mixtures thereof, said preservative having a ph of from 4.5 to 5.5 and is heat stable up to about 120° C., said calcium component present in said preservative in an amount of from 3,000 to 4,000 mg for each 100 to 200 cc of said fermented solution, said alcohol present in said solution in an amount of at least 3% by weight of said solution, said vinegar comprising acetic acid and having a concentration of at least 10–17%, and said calcium component comprising a powder having a size not exceeding 30 mm.

2. The preservative of claim 1 wherein at least one of the following materials is added together with calcium component to the fermented solution: ascorbic acid, sodium acetate, sugar fatty acid ester, glyceric fatty acid, glycin, calcium citrate, calcium acetate, calcium lactate, polyridine, chitosan and mixtures thereof.

3. A food and beverage preservative comprising:
   A. from 100–200 parts water;
   B. from 20–40 parts of a 40% to 90% alcohol;
   C. from 0.1–1.0 parts of acetic acid bacteria fermenting agent;
   D. from 20–100 parts of a vinegar and
   E. from 8–40 parts of a calcium component having a 1.0 to 30 mm size, wherein said calcium component is derived from a material selected from the group consisting of egg shells, clam shells, oyster shells, scallop shells, animal bones, fish bones, coral or mixtures thereof.

4. The preservative of claim 1 comprising about 3,800 mg of said calcium component for each 100 cc of said fermented solution.

5. A method of treating a food or beverage composition to enhance its useful life which comprises adding from 1%–6% by weight of a preservative based upon the weight of said food or beverage composition, said preservative comprising a calcium component and a fermented solution of vinegar, alcohol and a fermented agent, said calcium components derived from a up to 30 mm powder of a material selected from the group consisting of egg shells, scallop shells, clam shells, oyster shells, coral, animal bones, fish bones or mixtures thereof, said preservative having a ph of from 4.0 to 7.0 and is heat stable up to 110° C., said calcium component present in said preservative in an amount of from 1,000 to 8,000 mg for each 100 to 200 cc of said fermented solution, said alcohol present in said solution in an amount of at least 3% by weight of said solution.

\* \* \* \* \*